J. F. O'BYRNE.
METHOD OF FINISHING VEHICLE BODIES AND FINISHING COVERS THEREFOR.
APPLICATION FILED JUNE 11, 1917. RENEWED AUG. 4, 1919.
1,332,269.
Patented Mar. 2, 1920.
3 SHEETS—SHEET 2.
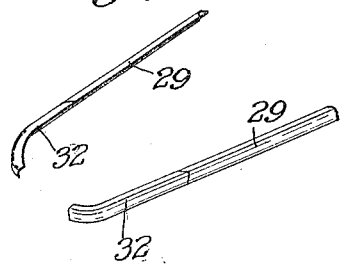
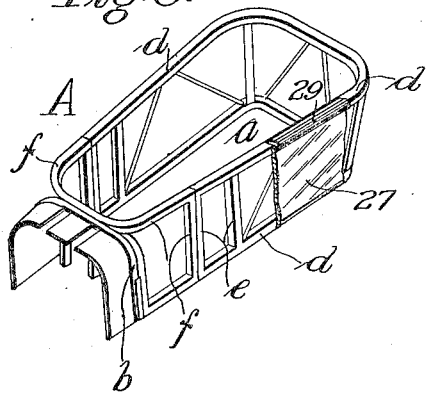
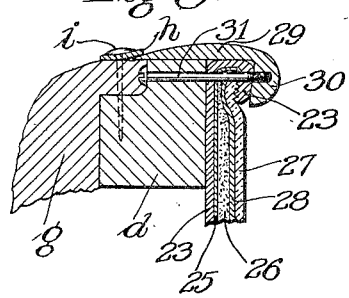
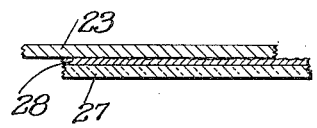
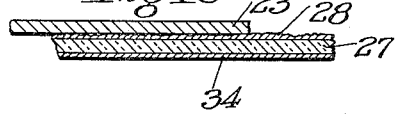
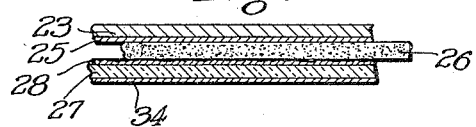
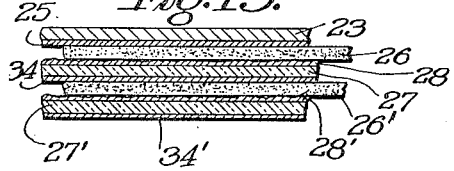
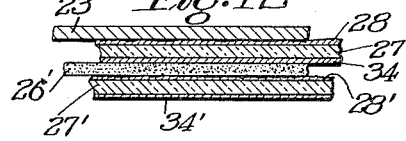
WITNESSES:
W. C. Ross.
INVENTOR.
Joseph F. O'Byrne.
BY Chapin + Neal
ATTORNEYS.

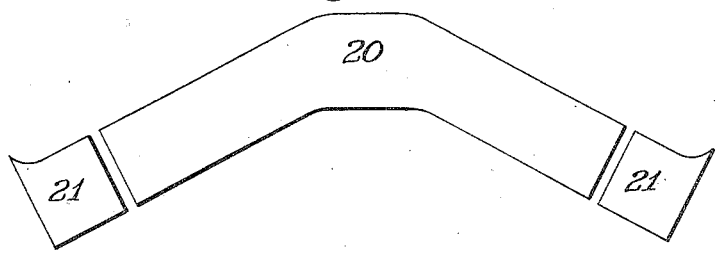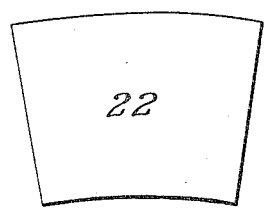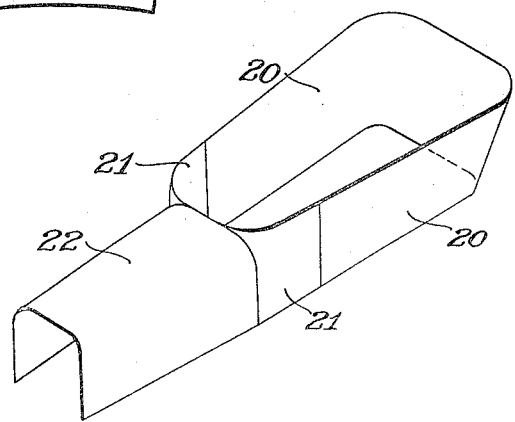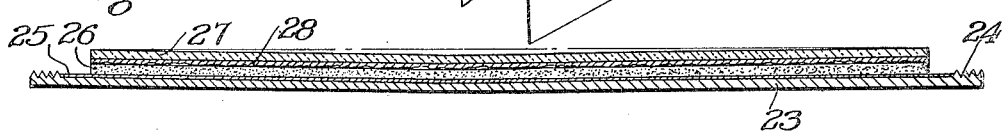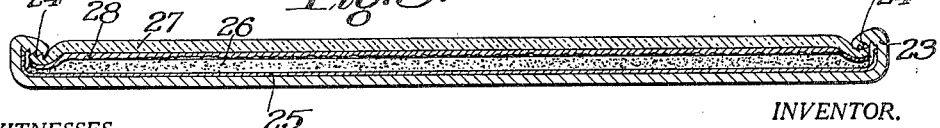

UNITED STATES PATENT OFFICE.

JOSEPH FRANCIS O'BYRNE, OF TONOPAH, NEVADA.

METHOD OF FINISHING VEHICLE-BODIES AND FINISHING-COVERS THEREFOR.

1,332,269. Specification of Letters Patent. Patented Mar. 2, 1920.

Application filed June 11, 1917, Serial No. 174,139. Renewed August 4, 1919. Serial No. 315,285.

*To all whom it may concern:*

Be it known that I, JOSEPH FRANCIS O'BYRNE, a citizen of the United States of America, residing at Tonopah, Nevada, have invented certain new and useful Improvements in Methods of Finishing Vehicle-Bodies and Finishing-Covers Therefor, of which the following is a specification.

This invention relates to a method of finishing vehicle bodies and to finishing covers therefor. More particularly, this invention relates to finishing covers for vehicles which are protected and decorated by the method disclosed in my copending application Serial No. 148,193, filed February 12, 1917.

Coverings for vehicle bodies, as used heretofore, have consisted of suitable covering material, such as sheet metal, for example, which has been exteriorly painted, varnished, and rubbed down to obtain a polished decorative surface. As is well known, smooth, highly polished, painted, varnished, or the like surfaces are obtained with difficulty and only by careful and expert work. Such surfaces are expensive in that they require a considerable expenditure of time and labor to secure the desired degree of luster. The painted, varnished, and polished surfaces on a vehicle body, such as an automobile body, are furthermore exposed so that they are particularly susceptible to injury by contact, exposure to the elements, the constant bombardment of minute dirt and dust particles and the like. Thus, the high polish originally provided on the vehicle bodies cannot be readily retained.

An object of this invention is to provide a covering for a vehicle body which involves a decorative layer capable of being economically obtained with an improved lustrous quality and another layer of transparent material to protect the decorative layer and through which the latter is visible.

Another object of the invention is to provide a method of finishing and weather-proofing vehicle bodies which consists in applying or superimposing upon the painted surface transparent, waterproof, and protective material and suitably securing the latter to the body.

Another object of the invention is to provide a vehicle body covering made up of flat sheets which may be bent into shapes to conform to the body and are removably secured thereto, each of said sheets involving a body layer, a protective layer of transparent material, and a decorative layer applied to the transparent material and arranged to be visible through the latter.

Other objects and advantages will appear in the following description and will be particularly pointed out in the appended claims.

For the purpose of illustrating one manner in which the invention may be practised, a preferred embodiment thereof with detailed variations is shown in the accompanying drawings in which—

Figure 1 is a view showing the developed shape of one part of the covering material;

Fig. 2 is a similar view of another part of the covering material;

Fig. 3 is an isometric view showing the parts shown in Figs. 1 and 2 in assembled relation and in the positions to which they are curved for application to the vehicle body;

Fig. 4 is a sectional view illustrative of the manner of building up the layers of each covering sheet;

Fig. 5 is a similar view showing the manner of holding the assembled layers together;

Fig. 6 is an isometric view of a vehicle body to which the coverings shown in Fig. 3 may be applied;

Fig. 7 is an isometric view of a means for fastening the curved coverings to the body;

Fig. 8 is a cross sectional view showing a portion of the covering material fastened to the body;

Figure 14:
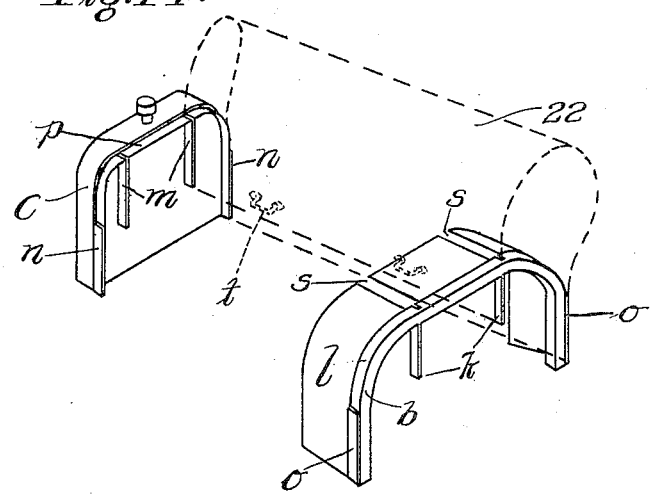
Figure 15:
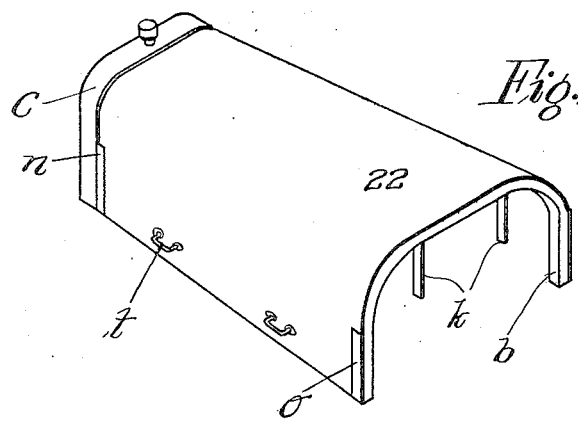

Figs. 9 to 13, inclusive, are fragmentary sectional views illustrative of various ways in which the layers of the covering material may be built up;

Fig. 14 is an enlarged perspective view illustrating the hood covering between the cowl and radiator portions of the body with the hood in open position; and Fig. 15 is a view similar to Fig. 14 showing the hood covering in closed position.

The invention will be described herein for the purposes of illustration, in merely one of its specific uses, namely, as a covering for automobile bodies. The invention is, however, capable of other uses than the specific one to be described.

Referring to the drawings and particularly to Fig. 6, the body frame to be covered is indicated generally at A. The frame 11

A may, for example, comprise a suitable tonneau portion $a$, a cowl $b$, and a radiator $c$. The tonneau portion may be made up of spaced upper and lower bars $d$ which are bent into the desired shape and between which are substantially upright bars $e$. At the forward end of the tonneau are door frames $f$ which may be hinged to uprights $e$, and, when closed, are positioned as shown in Fig. 6.

The coverings to be applied to frame A are made up in sheet form in such a manner that they may thereafter be curved or rolled as single curved surfaces about the frame. The developed shape of the several covering members is clearly shown in Figs. 1 and 2. The coverings for the tonneau portion $a$, to inclose the space between bars $d$ and the uprights $e$ adjacent doors $f$, involve portions of generally cylindrical surfaces and other substantially flat portions. Such a surface is developable, and the sheet 20 cut in substantially the shape shown in Fig. 1 may be bent into the shape shown in Fig. 3 to fit around the tonneau portion. The doors $f$ involve similar surfaces and the sheets 21 cut in the shape shown in Fig. 1 may likewise be bent into the shape shown in Fig. 3 to fit around the door frames. The hood to inclose the space between the cowl $b$ and radiator $c$ involves surfaces which, in this instance, are substantially conical, and a sheet 22 cut in the form shown in Fig. 2 may be bent into the shape shown in Fig. 3 to fit around the cowl and radiator and to inclose the space therebetween. Thus, it will be seen that the coverings for body frame A may each be made up out of flat sheets which may be rolled into shapes to conform to the shape of the body frame. The term "developable" is intended in its geometrical significance as meaning a surface which may be laid out in flat form and thereafter rolled or curved into the desired shape.

Each of the coverings is not, however, a single sheet as has been shown in Figs. 1, 2, and 3, for illustrative purposes, but on the contrary each covering is built up of a plurality of layers in a manner best shown in Figs. 4 and 5. The latter may be considered for illustrative purposes as a longitudinal or a transverse section of any of the members 20, 21, or 22. Each covering, in one form of my invention, involves a metallic sheet 23 cut in any of the shapes shown in Figs. 1 or 2, and having a milled edge 24 along all four edges thereof. Sheet 23 may then be decorated with paint, varnish, or the like in the usual manner to form a polished decorative layer 25. The remaining layers of the covering are cut in the same shape as the metallic layer 23 but are of smaller size so as to leave the milled edges 24 exposed therearound. A layer 26 of felt, flannel, or the like is superimposed upon the polished surface of the decorative layer 25 and upon the layer 26 is superimposed a layer of transparent protective material 27. The latter has a decorative layer 28 of paint, varnish, or the like on one surface, and the layer 28 is positioned contiguous to the felt 26 so that it is visible only through the transparent material.

The four milled edges 24 of sheet 23 are then rolled up as indicated in Fig. 5 to bring the milled edges 24 against the top edges of the transparent material 27. Pressure is then applied to force the overlapping and milled portions of sheet 23 against the layer 27 to compress the several layers and bind them along their edges to the sheet 23. Preferably the several layers of each covering member are assembled when slightly bent, as indicated in Fig. 4, rather than in true flat form. By so doing, the sheet 23 when flattened out will, therefore, stretch the transparent material 27 into a smooth flat sheet, the grip of the milled portions 24 thereon being sufficient to securely hold the part 27 under tension. The several layers of each covering may be made very thin so that the entire assembly is readily flexible. The layers have been shown in magnified and exaggerated form in the drawings merely for illustrative purposes.

The transparent sheet 27 may be of any suitable material which is transparent, flexible, and preferably highly polished. Celluloid is an example of a material which has the requisite qualities, but, owing to its inflammability is not generally satisfactory. There are other materials, however, closely resembling celluloid in appearance, but not inflammable, which are suitable, such as cellulose acetate material, and that material now largely used for motion picture films, for example. Such materials as described are furthermore advantageous in that they are waterproof.

The decorative layer 28 is of suitable opaque coloring matter preferably paint, varnish, or the like although other coloring material, such as burnished photographic paper, may be used, for example. When paint and the like is employed for the decorative layer 28, it need not be applied with particular care to the transparent sheet 27. It may be applied in a rough way if desired by dipping the sheet in paint or spraying or pouring the paint on the sheet. The irregularities in the outer surface of the decorative layer do not matter for despite these irregularities, the inner surface is necessarily smooth since it is contiguous to the polished transparent sheet 27. Thus, the decorative layer 28, when viewed through the transparent material 27, is of absolutely uniform color and possesses a high degree of luster, as more fully pointed out in the above-named copending application, and this luster is not obtainable in any other manner so far as I am aware as conveniently and efficiently as that herein described.

The coverings built up in layers, as described, and bent into the shapes shown in Fig. 3 are then applied to the body frame A shown in Fig. 6. The tonneau and both door coverings of the shape shown in Figs. 1 and 3 at 20 and 21, respectively, are applied and secured to the body in the same way and only one thereof need be described. The tonneau covering is wrapped around the body frame A to inclose the space between the upper and lower bars $d$, and the space between the two uprights $e$ adjacent doors $f$. The covering is removably secured to the bars $d$ along its upper and lower edges and to the bars $e$ (adjacent doors $f$) along its two side edges by any suitable means. For example, moldings 29, such as shown in Fig. 7, may be used along the top bars $d$ to hold the upper edge of the covering in a manner best shown in Fig. 8. The molding 29 is laid upon the top of bar $d$ and has a curved depending hook portion 30 to overlap the crimped portion of the covering. A screw or bolt 31 is then passed transversely through bar $d$ from the inner side thereof, through layers 23 to 28, inclusive, and into the hook portion 30, having a screw thread engagement with the latter. Thus the hook 30 may be drawn toward bar $d$ to clamp the members 23 to 28, inclusive, tightly therebetween. The upholstery, indicated conventionally at $g$, on the inside of the tonneau portion $a$ conceals the heads of bolts 31 and the inner edges of molding 29 may be concealed by the usual upholstery strip $h$ of leather or the like, which is held to bar $d$ by suitable tacks $i$. The bottom edges of the tonneau covering and the two side edges thereof may be held by similar moldings, and the coverings for doors $f$ may also be similarly removably secured. Reference numeral 32 in Fig. 7 indicates a molding suitable for use along the upper horizontal edge of the door frame $f$.

The hood covering, represented generally by reference numeral 22, is mounted in a somewhat different manner. The cowl has a flange $l$ extending toward the radiator $c$ upon which one edge of the hood covering 22 is adapted to rest, and radiator $c$ has a flange $p$, extending toward cowl $b$, upon which the other edge of the covering is adapted to rest. Cowl $b$ and radiator $c$ have strips $o$ and $n$, respectively, secured thereto on each outer lower face, which strips are substantially U-shaped in cross-section and form slots in which the hood covering 22 may be positioned, as indicated in Fig. 15. Thus, the covering is held against longitudinal displacement by the strips $n$ and $o$ which are arranged one at each corner of the covering. The latter is provided with the customary handles $t$ which may be removably held to the automobile frame by the ordinary well known devices. The latter, thus serve to stretch the hood covering around the flanges $l$ and $p$, whereby the hood appears as one smooth, unbroken surface.

Intermediate the strips $n$ are similar parallel and vertically disposed strips $m$ and in line with the latter and on cowl $b$ are similar strips $k$. Instead of positioning hood 22 in both strips $n$ and both strips $o$, it may be positioned on one side by a strip $n$ and a strip $o$ and on the other side by one of the strips $m$ and one of the strips $k$, as indicated in Fig. 14, the hood being shown in dotted lines the better to reveal the structure. The hood 22, being of thin flexible material, may readily be moved into the last-named position to allow access from one side to the space between the cowl $b$ and radiator $c$. Obviously, the hood may also be positioned by the strips $k$, $m$, $n$, and $o$, which are shown as unoccupied in Fig. 14 to expose the space between the radiator and cowl on the other side. The hood may be entirely removed with convenience if desired. Thus, the hood, although made of one piece for effective application of the decorative and protective material, may be as readily opened and closed as the type of hood now generally used and may be entirely removed more readily than the type generally in use. The hood structure described is more particularly pointed out and claimed in my co-pending application. Serial No. 201,488, filed November 12, 1917.

The several coverings described may consist of other combinations of layers which are made up in a similar manner to that described but which are arranged for various other decorative effects. The body sheet 23 of metal may be left entirely unfinished and may be protected and decorated in a simple and economical manner by merely superimposing thereon the sheet of transparent material with a layer of coloring matter on the face adjacent the sheet 23, as shown in Fig. 9. If desired, covering shown in Fig. 9 may have on the outer surface of the transparent material 27 a coating 34 of paint or the like, applied in the usual manner and rubbed down to obtain a high polish. By this method, when the outer painted coat 34 becomes worn, it may be removed by any suitable means, such as a paint remover, for example, to reveal through the transparent material 27 a fresh highly polished and lustrous coating 28. The transparent sheet 27 painted on both sides, as shown in Fig. 10, may be applied to the painted covering 23 shown in Figs. 4 and 5, to produce the covering shown in Fig. 11. With the covering shown in the latter, three decorative coatings may be successively revealed, and, if desired, the coatings may be made of different colors. Moreover, the built-up coverings shown in Figs. 10 and 11 may have superimposed thereon a sheet of flannel, felt, or the like 26' and, upon the latter, a sheet 27' of transparent material which is decorated on both sides, as indicated at 28' and 34'. Thus, the coverings may be so built up that any desired number of freshly painted and polished surfaces may be successively revealed or so that various colored coatings may be obtained when desired.

The coverings described are particularly advantageous as a finishing means for vehicle bodies. They constitute a plurality of removable forms, which may be economically made up out of flat sheets in such shapes that they may be readily curved to fit the body and thereafter removably secured thereto. The decorative material may be economically applied and even in a rough manner to produce highly polished decorative surfaces of an improved luster which can only be otherwise approximated by careful and expert work and at a considerable expense due to the repeated rubbing down processes necessary to secure a high polish. Moreover, the decorated surfaces thus obtained are effectively protected against the constant bombardment of minute particles of sand, dirt, and the like, so that the highly lustrous surface may be retained for long periods. The polished decorated surfaces of automobiles undergo repeated washings and, therefore, repeated scratchings, but with the covering described the paint or the like is not affected since the transparent material alone is exposed. Any dulling of the outer surface of the transparent sheet 27 caused by repeated washing, oxidation, or scratching may readily be removed by buffing the sheet. The inner and painted surface of the transparent material, however, need not be touched.

Thus, an improved method of finishing vehicle bodies and an improved finishing cover therefor has been provided. The use of the word "paint" throughout the description is intended to include paint, varnish, or any like substance which may be applied for a similar purpose to a sheet of transparent material, as celluloid or like substances or any substances such as glass which may embody the invention for the purpose described. The invention has been described in a preferred form with detailed variations for the purposes of illustration, but the scope of the invention is defined by the appended claims rather than by the foregoing description.

What I claim is—

1. A finishing cover for vehicle bodies, comprising, a series of separate polished layers of transparent material, each of said layers having a colored opaque covering on its interior face.

2. A finishing cover for vehicles bodies, comprising, a series of polished separate layers of transparent material, each of said layers having a colored opaque covering on its interior face and a colored opaque coating on its exterior face.

3. A finishing covering for vehicle bodies comprising, a finished body in combination with a plurality of layers of polished transparent material, each of said layers having a colored opaque covering on its interior face.

4. A finishing covering for vehicle bodies comprising a finished body in combination with a plurality of layers of polished transparent material, each of said layers having a colored opaque covering on its interior face and a colored opaque covering on its exterior face.

5. A finishing covering for vehicle bodies which consists of an opaque colored layer disposed adjacent to the body, a second opaque colored layer and a transparent layer separating said colored layers.

6. A finishing covering for vehicle bodies which consists of an opaque colored layer disposed adjacent to the body, a second separate opaque colored layer disposed adjacent to the first opaque colored layer, a third separate layer of transparent material disposed adjacent to the second separate opaque colored layer, and a fourth opaque colored layer disposed adjacent to the third separate layer of transparent material.

7. A finishing cover for vehicle bodies, which consists of a transparent layer disposed adjacent the body and an opaque colored layer disposed between the body and said layer and adhering to the latter.

8. The combination of a vehicle body, which includes a frame and outer shell, of a finishing cover therefor embodying a developable shell-like layer fitted about the surface of the body.

9. The combination of a vehicle body, which includes a frame and outer shell, of a finishing cover therefor embodying a developable shell-like layer fitted about the surface of the body and removably fastened thereto.

10. The combination of a vehicle body, with a finishing cover therefor embodying a shell-like transparent layer shaped to fit the surface of the body and removably fastened thereto, and a coloring layer between the body and the said shell-like layer.

11. A finishing cover for vehicle bodies comprising a series of separate polished layers of transparent material, each of said layers having a colored opaque coating on its interior face, and each transparent layer being so fastened as to permit of easy removal from the underlying separate polished layer of transparent material for the purpose of avoiding injury to said underlying separate polished layer of transparent material.

12. The combination of a vehicle body, with a finishing cover therefor embodying a transparent shell-like layer shaped to fit the surface of the body and having a coloring layer covering the inner surface of the shell-like layer.

13. A protective covering for vehicle bodies, which consists of a plurality of removable forms, each form being painted and varnished, and means for protecting the painted surfaces of certain of the forms.

14. A vehicle body covering comprising a plurality of thin, painted, and varnished, removable forms carried by the body portion of the vehicle, and protecting layers disposed between said forms and between one of said forms and the body portion of the vehicle.

15. The combination of a vehicle body, with a finishing covering including a removable form applied to the surface of the body, and a protective layer intermediate the form and surface of the body.

16. The combination with a painted and varnished vehicle body, of a weather-proof transparent coating therefor comprising a water-proof sheet developable into a shape to conform with that of the body portion, and means for securing the transparent coat to the body portion.

17. The combination of a vehicle body including a frame and a metallic shell, with a finishing covering therefor including a removable form applied to the surface of the body, a coating layer on the form, and means for removably fastening the form to the said body.

18. The combination of a vehicle body including a frame and a metallic shell, with a finishing covering therefor including a shell-like form shaped to bend about and fit the surface of the body and painted on its external surface, and means for fastening the form removably to the body.

19. The combination of a vehicle body including a frame and a metallic shell, with a finishing covering therefor including a shell-like form of opaque material applied to the surface of the body, and means for removably fastening the shell to the body.

20. A finishing covering for vehicle bodies, consisting of a plurality of opaque colored layers and transparent layers separating the first-named layers.

21. A finishing cover for vehicle bodies, consisting of a developable member formed of transparent protective material and having on one surface an opaque coloring layer, said member being curved to fit about an automobile body and adapted to be removably secured thereto with the colored layer adjacent the body.

22. A finishing cover for a vehicle body, comprising, one or more developable sections of transparent material, shaped to fit about the body and adapted to be removably secured thereto, and a layer of coloring material on the inner surface of each section.

23. A finishing cover for a vehicle body, comprising a substantially flat sheet of transparent material adapted to be bent into shape to fit the surface of a vehicle body and a coloring layer covering the inner surface of said material.

24. A finishing cover for vehicle bodies, which consists of a transparent layer disposed adjacent the body and an opaque colored layer on each face of said transparent layer.

25. The combination with a vehicle body, of a finishing cover therefor, comprising a sheet of transparent material and a coloring layer covering one surface of said material, said sheet being previously cut to shape and fitted about the body with the coloring layer adjacent to the latter, and means to removably secure the sheet to the body along the edges thereof.

26. The combination with a vehicle body, of a finishing cover therefor, comprising a flexible metallic sheet, a sheet of transparent material and a coloring layer covering one surface of said material, said sheets being previously cut to shape, fastened together with the coloring layer adjacent the metallic sheet, and fitted about the body, and means to removably secure said covering to the body.

27. The herein-described method of finishing automobile bodies, which consists in applying a decorative layer to one surface of transparent material and in applying said material to the body with the decorative layer adjacent the latter.

28. The herein described method of finishing vehicle bodies, which consists in applying to the painted and varnished surface of the vehicle body a plurality of removable painted and varnished layers of transparent material and interposing between said layers a soft protective layer.

29. The herein described process of weather-proofing automobile bodies and the like, which consists in first painting and varnishing the surface of the body, applying to the painted and varnished surface of the body a transparent weather-proof sheet previously developed from and adapted to be bent into the shape of the body.

30. The herein described process of weather-proofing automobile bodies and the like, which consists in first painting and varnishing the surface of the body, applying to the painted and varnished surface of the body a transparent weather-proof sheet previously developed from and adapted to be curved into the shape of the body, and securing said transparent sheet to the body at the edges thereof.

31. The herein described process of weather-proofing vehicle bodies and the like, which consists in making a coating from a water-proof transparent flexible sheet which is shaped to conform to the contour of the body, and securing said coating to the body portion at the edges thereof.

32. The herein described process of weather-proofing vehicle bodies or the like, which consists in first painting and varnishing the surface of the body, making a removable coating from a water-proof, transparent, flexible sheet which is shaped to conform to the contour of the body, and securing said coating to the body portion at the edges thereof.

JOSEPH FRANCIS O'BYRNE.